(12) United States Patent
Luciere

(10) Patent No.: US 7,078,617 B1
(45) Date of Patent: *Jul. 18, 2006

(54) COMPUTER CABLE ORGANIZER

(76) Inventor: Ralph Luciere, 276 Cedarhurst Ave., Cedarhurst, NY (US) 11516

( * ) Notice: Subject to any disclaimer, the term of this patent is extended or adjusted under 35 U.S.C. 154(b) by 0 days.

This patent is subject to a terminal disclaimer.

(21) Appl. No.: 11/097,555

(22) Filed: Apr. 1, 2005

Related U.S. Application Data

(63) Continuation-in-part of application No. 10/872,977, filed on Jun. 21, 2004, now Pat. No. 6,903,266.

(51) Int. Cl.
*H02G 3/04* (2006.01)

(52) U.S. Cl. .............. 174/48; 174/68.1; 174/68.3; 174/95; 385/135; 52/220.1; 52/220.7

(58) Field of Classification Search ............ 174/48, 174/49, 68.3, 68.1, 95, 97, 70, 74 A, 99 R, 174/96, 60, 100, 135; 220/3.2, 3.3, 4.02; 52/220.1, 220.3, 220.5, 220.7; 248/49, 56, 248/59, 65, 68.1, 70; 211/162, 166, 175, 211/207, 188; 439/207, 208, 209, 210, 212, 439/214, 215, 216; 385/134, 135
See application file for complete search history.

(56) References Cited

U.S. PATENT DOCUMENTS

| | | | |
|---|---|---|---|
| 3,038,558 A | 6/1962 | Plummer | |
| 3,092,530 A | 6/1963 | Plummer | |
| D251,779 S | 5/1979 | Wolff | |
| 4,164,618 A * | 8/1979 | Casasanta | ............ 174/48 |
| 4,203,639 A | 5/1980 | VandenHoek | |
| 4,255,610 A | 3/1981 | Textoris | |
| 4,602,124 A | 7/1986 | Santucci | |
| D305,189 S | 12/1989 | Scherrer | |
| 4,953,735 A | 9/1990 | Tisbo | |
| 5,024,614 A | 6/1991 | Dola | |
| 5,130,496 A | 7/1992 | Jenkins | |
| 5,144,896 A | 9/1992 | Fortsch | |
| 5,231,562 A | 7/1993 | Pierce | |
| 5,235,136 A | 8/1993 | Santucci | |
| 5,252,086 A | 10/1993 | Russell | |
| 5,286,919 A | 2/1994 | Benson | |
| 5,299,947 A * | 4/1994 | Barnard | ............ 439/215 |
| 5,381,994 A | 1/1995 | Welch | |
| 5,395,399 A | 3/1995 | Rosenwald | |
| 5,600,098 A | 2/1997 | Kazaks | |
| 5,640,912 A | 6/1997 | Diffrient | |
| 5,809,900 A | 9/1998 | Alexander | |

(Continued)

OTHER PUBLICATIONS cableorganizer.com, Corner Ducts Raceways, Printed on May 23, 2004.

(Continued)

*Primary Examiner*—Angel R. Estrada
(74) *Attorney, Agent, or Firm*—Brian Roffe

(57) ABSTRACT

A cable organizer including a first member defining an elongate channel receivable of cables and including a plurality of apertures through which the cables can be passed into or out of the channel and a second member defining an elongate channel and slidably connected to the first member. The second member is positionable in communication with an aperture in a lower side of the first member by sliding the second member along the lower side of the first member, e.g., in a channel formed in connection therewith for this purpose, such that the cables can be guided from the channel in the first member to the channel in the second member.

20 Claims, 16 Drawing Sheets

U.S. PATENT DOCUMENTS

| | | | |
|---|---|---|---|
| 5,831,211 A * | 11/1998 | Gartung et al. | 174/48 |
| 5,934,201 A | 8/1999 | Diffrient | |
| 5,934,203 A | 8/1999 | Glass | |
| 5,937,131 A * | 8/1999 | Haataja et al. | 385/135 |
| 5,971,508 A | 10/1999 | Deimen | |
| 5,971,509 A | 10/1999 | Deimen | |
| 6,003,447 A | 12/1999 | Cox | |
| 6,012,683 A | 1/2000 | Howell | |
| 6,037,538 A | 3/2000 | Brooks | |
| 6,192,805 B1 | 2/2001 | Saylor | |
| 6,211,460 B1 | 4/2001 | Hull | |
| 6,244,193 B1 | 6/2001 | Gutgsell | |
| 6,268,566 B1 | 7/2001 | Takiguchi | |
| 6,354,542 B1 | 3/2002 | Meyer | |
| 6,380,484 B1 * | 4/2002 | Theis et al. | 174/68.3 |
| 6,406,327 B1 | 6/2002 | Soon | |
| 6,410,855 B1 | 6/2002 | Berkowitz | |
| 6,424,248 B1 | 7/2002 | Toms | |
| 6,438,311 B1 | 8/2002 | Zarnowitz | |
| 6,448,497 B1 | 9/2002 | McCracken | |
| 6,452,805 B1 | 9/2002 | Franz | |
| 6,463,728 B1 | 10/2002 | Daoud | |
| D467,555 S * | 12/2002 | King et al. | D13/155 |
| 6,497,075 B1 * | 12/2002 | Schreiner et al. | 52/239 |
| 6,605,776 B1 | 8/2003 | Laukhuf | |
| 6,607,169 B1 | 8/2003 | Gershfeld | |
| D486,674 S | 2/2004 | Schoeben | |
| 6,713,678 B1 | 3/2004 | Masuda | |
| D488,054 S | 4/2004 | Myers | |
| 6,736,669 B1 | 5/2004 | Martin | |
| 6,756,539 B1 * | 6/2004 | VanderVelde | 174/48 |
| 6,903,266 B1 * | 6/2005 | Luciere | 174/48 |
| 2002/0094184 A1 | 7/2002 | Mattei | |
| 2003/0051892 A1 | 3/2003 | Mattei | |
| 2003/0066936 A1 | 4/2003 | Beck | |
| 2003/0119384 A1 | 6/2003 | Zhang | |
| 2004/0020883 A1 | 2/2004 | Brokaw | |

OTHER PUBLICATIONS cableorganizer.com, Cord Caddy Organizantional System, Printed on May 23, 2004.
cableorganizer.com, Cable Tamer Organizers by Aspect, Printed on May 23, 2004.
cableorganizer.com, Wire Duct, Printed on May 23, 2004.
cableorganizer.com, 1-Piece Latching Cable Raceway, Printed on May 23, 2004.
cableorganizer.com. Cable Tunnel Organizer, Printed on May 23, 2004.
cableorganizer.com, Cable Management Kit, Printed on May 23, 2004.
cableorganizer.com, Wire Tracks, Printed on May 23, 2004.
cableorganizer.com, 2-Piece Flex Tab Raceways, Printed on May 23, 2004.
wiretrakusa.com, Nonmetallic Wire Management Raceways and Accessories, Printed on May 23, 2004.
conputers4sure.com, Computer Cable Clips, Printed on May 23, 2004.
computer4sure.com, Jacks/Faceplates/Raceways, Printed May 23, 2004.

* cited by examiner

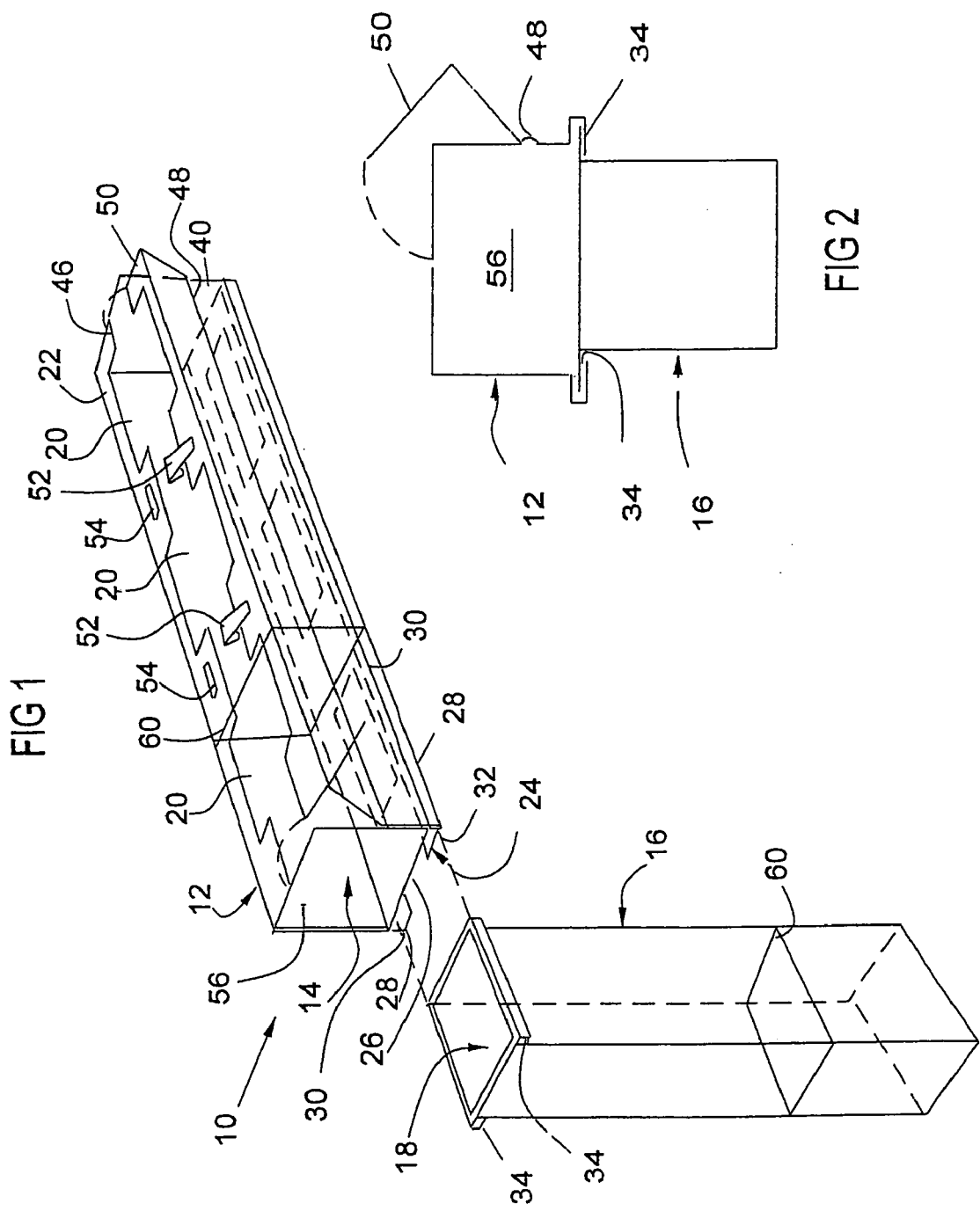

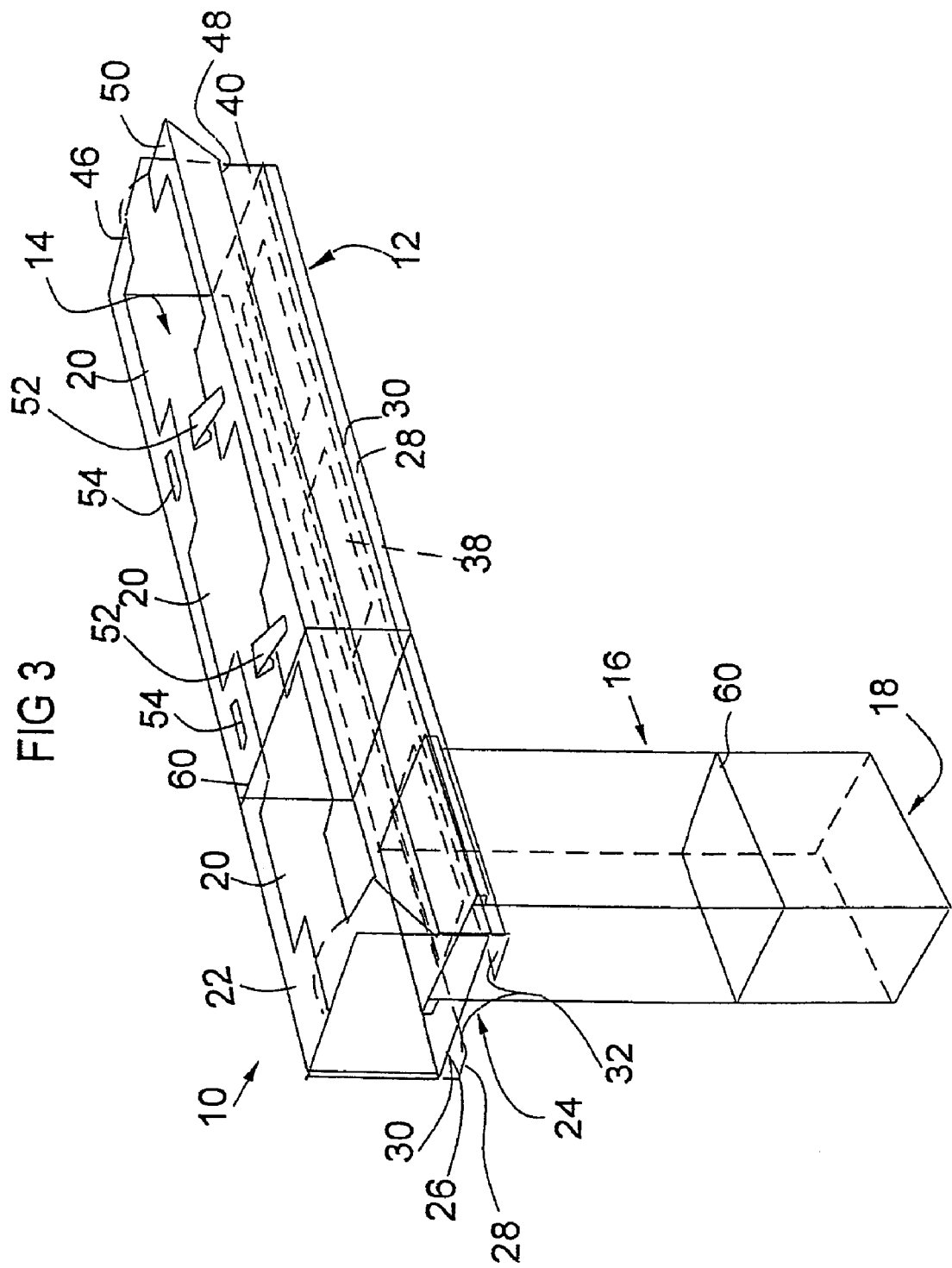

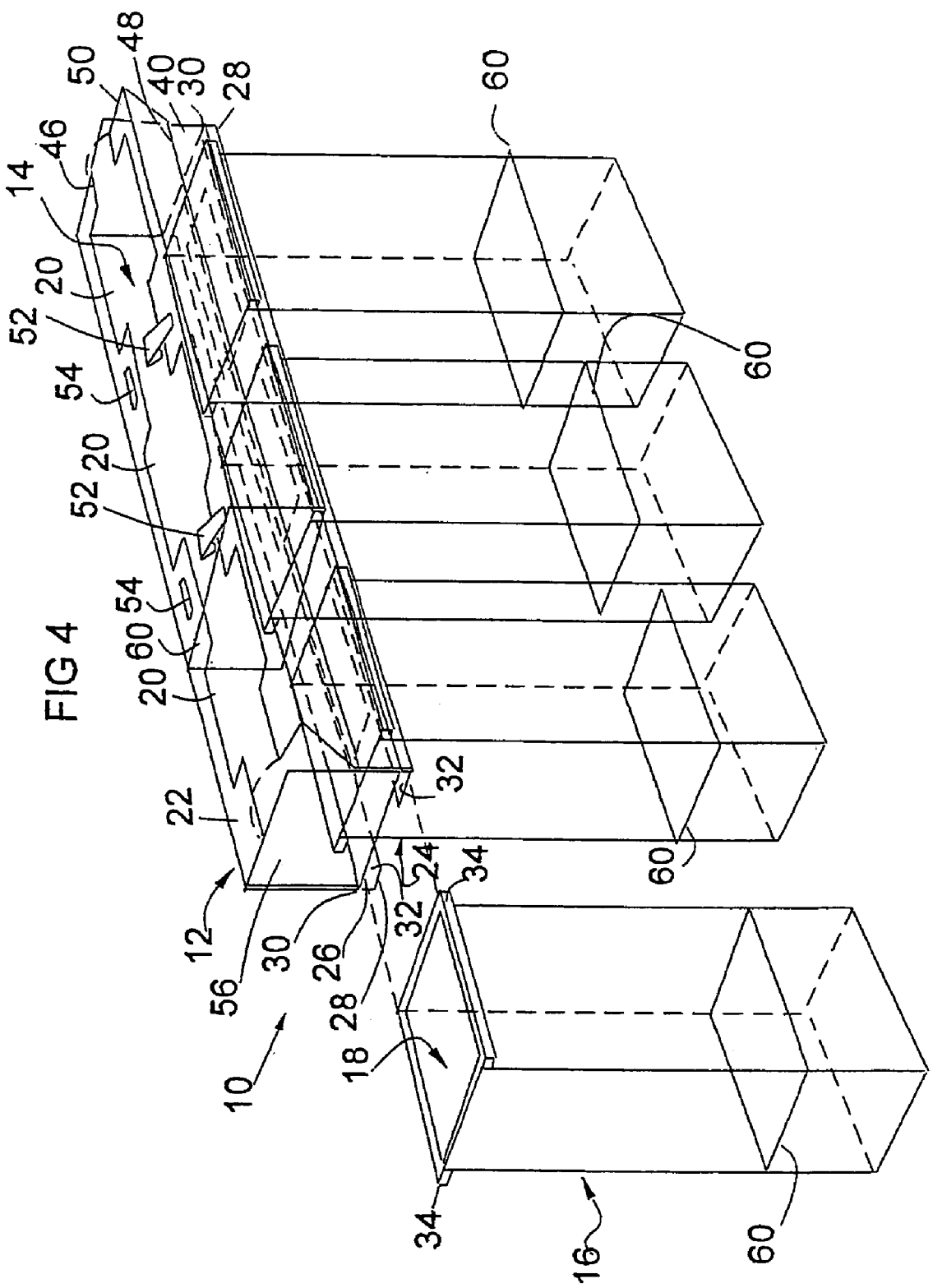

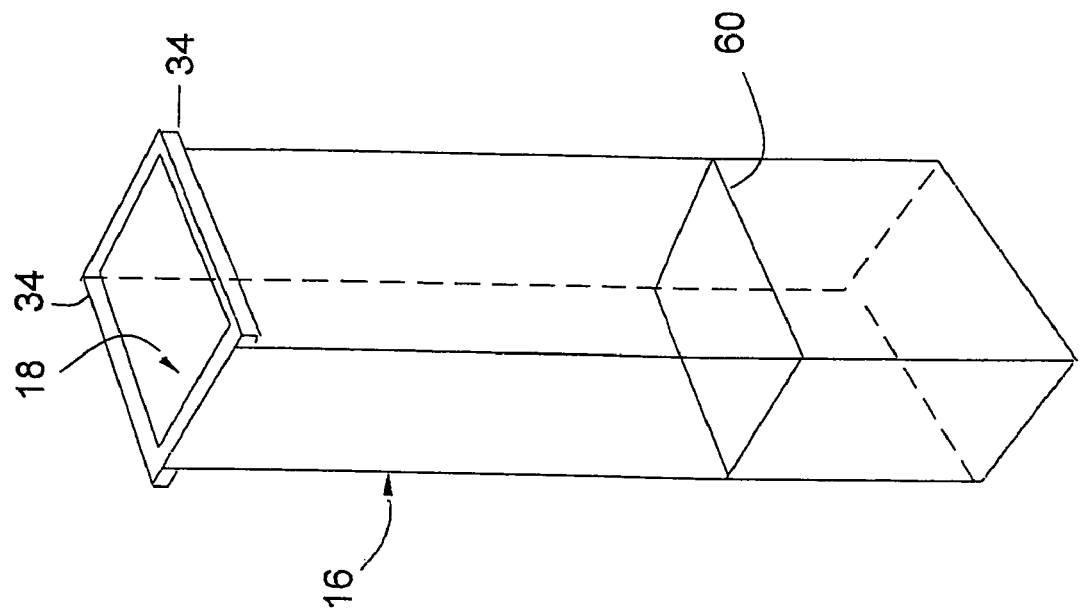

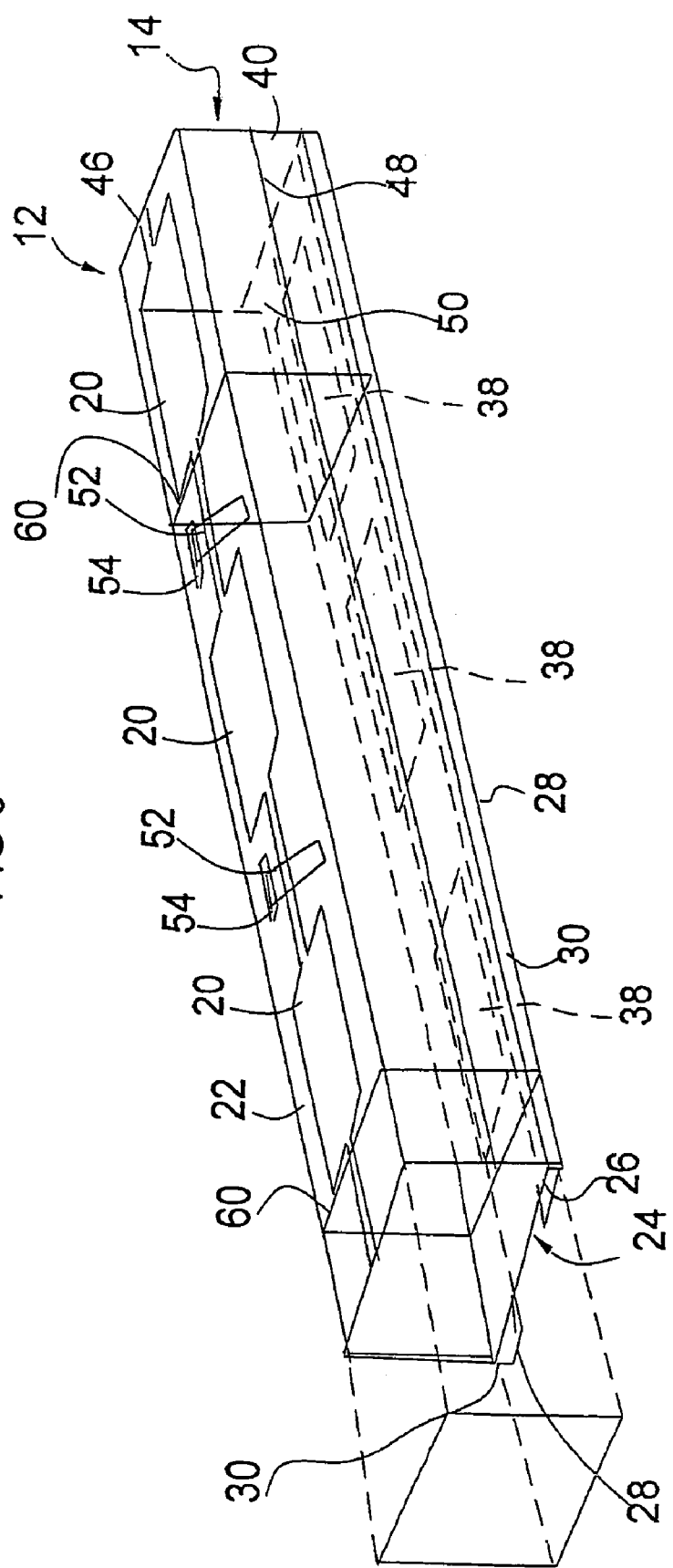

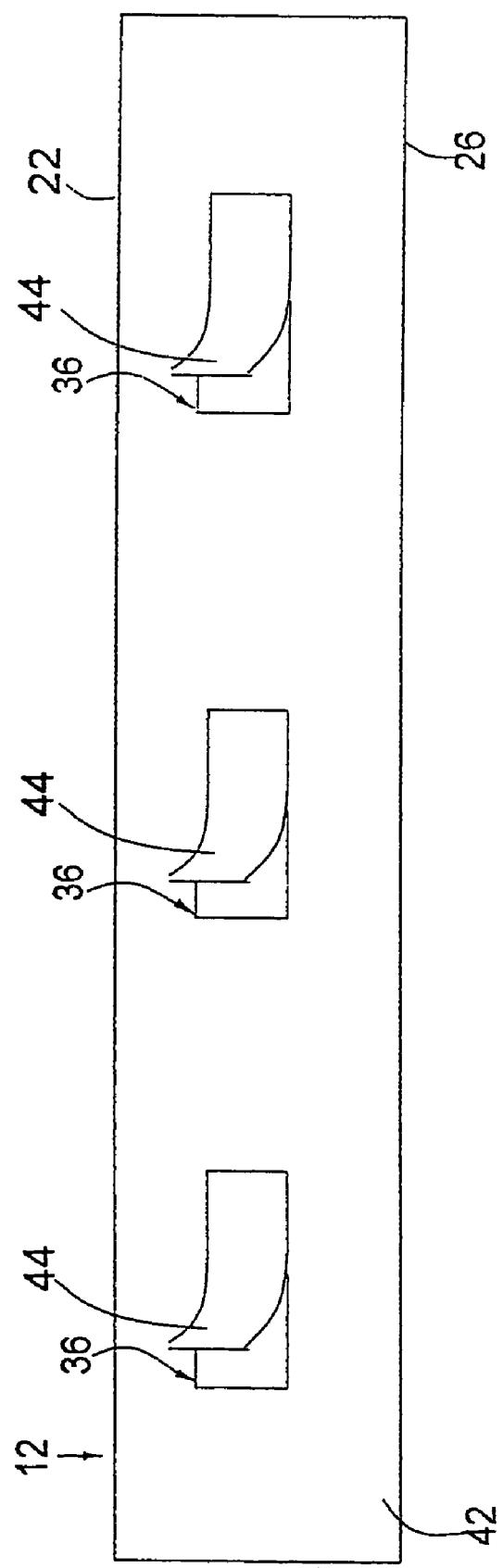

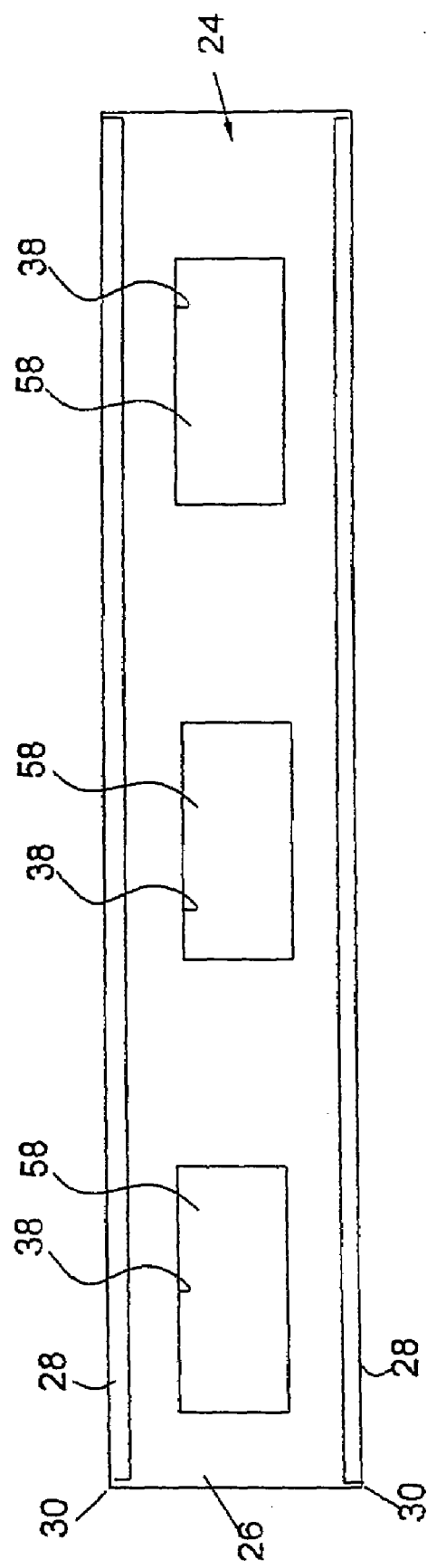

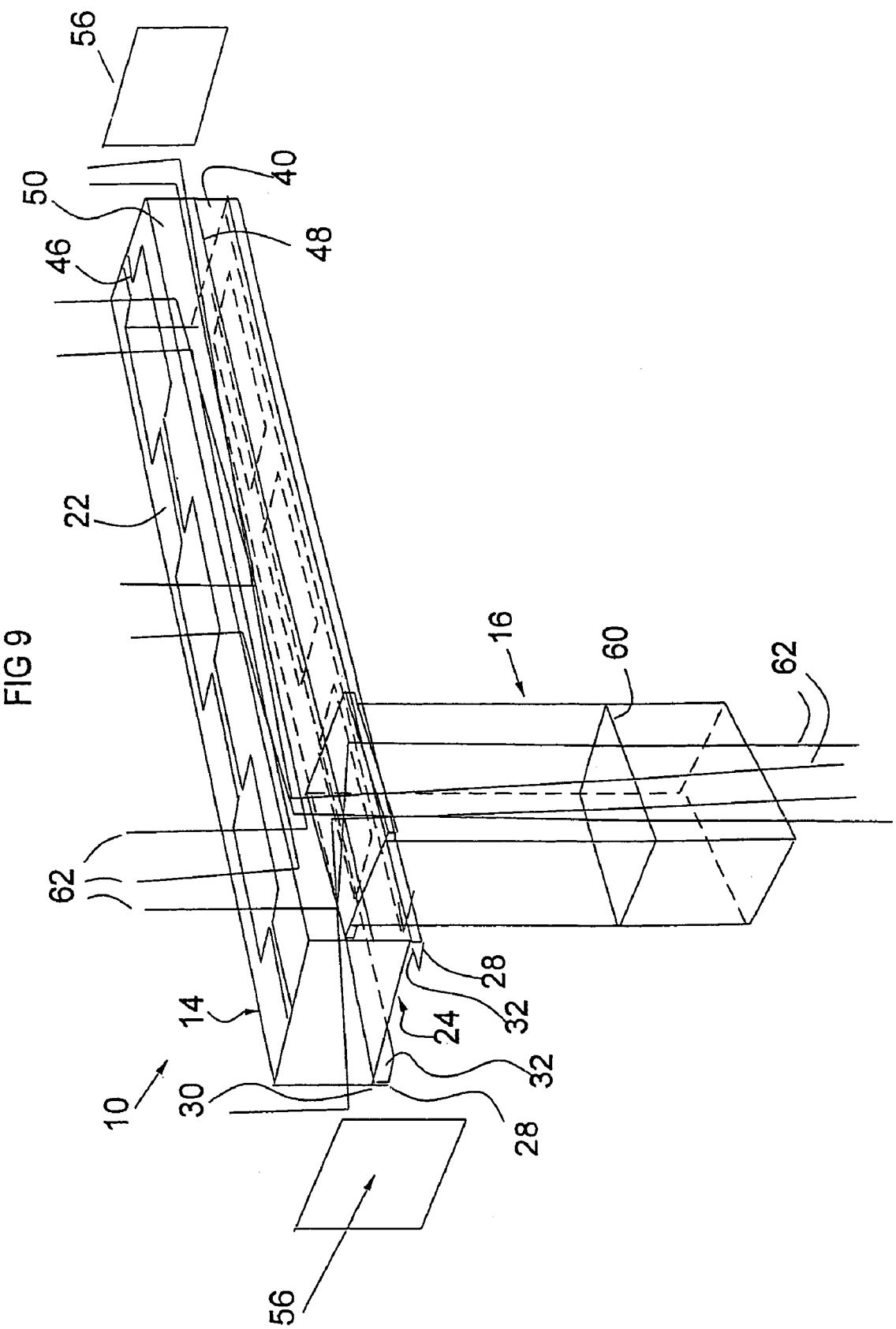

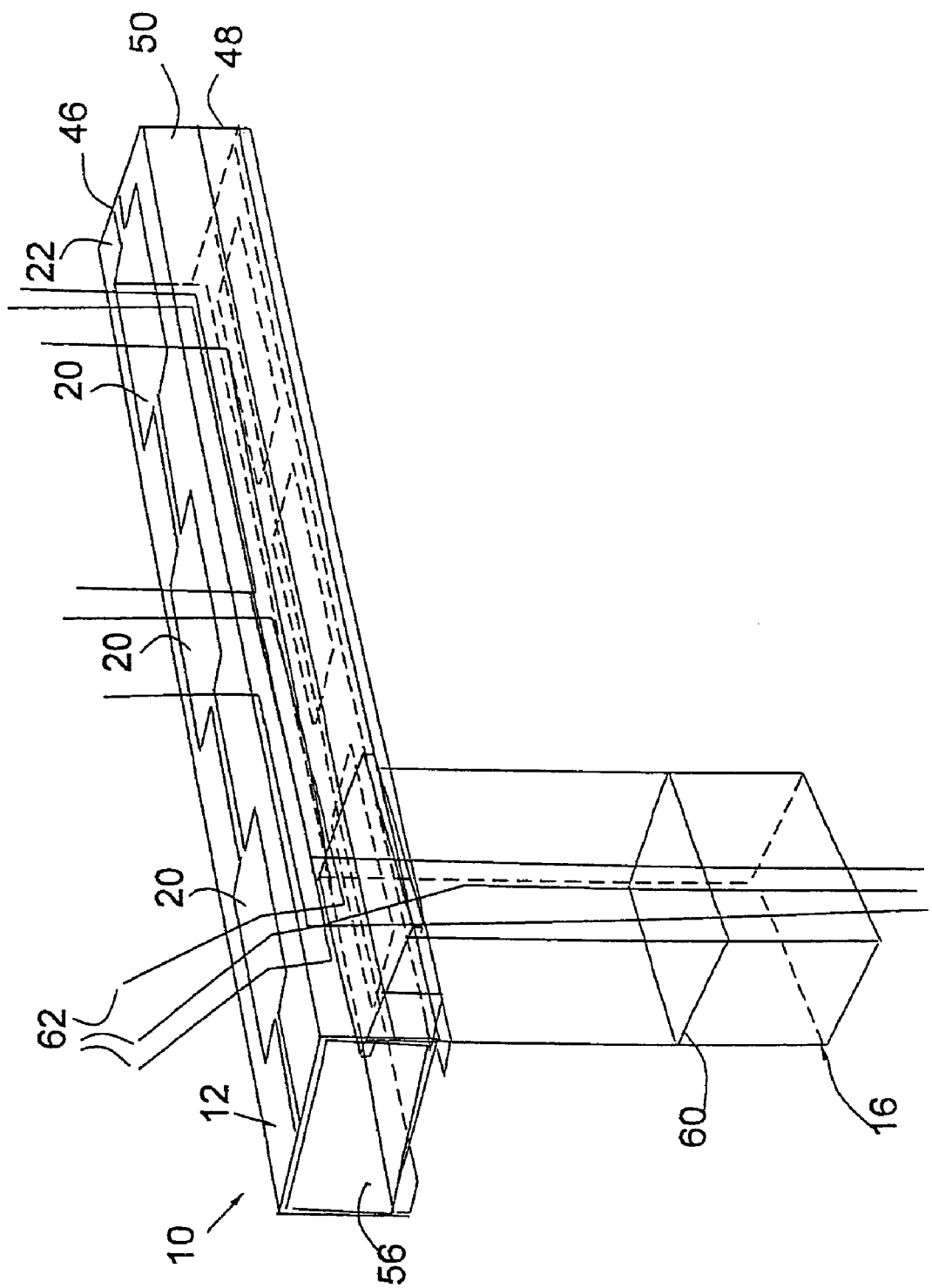

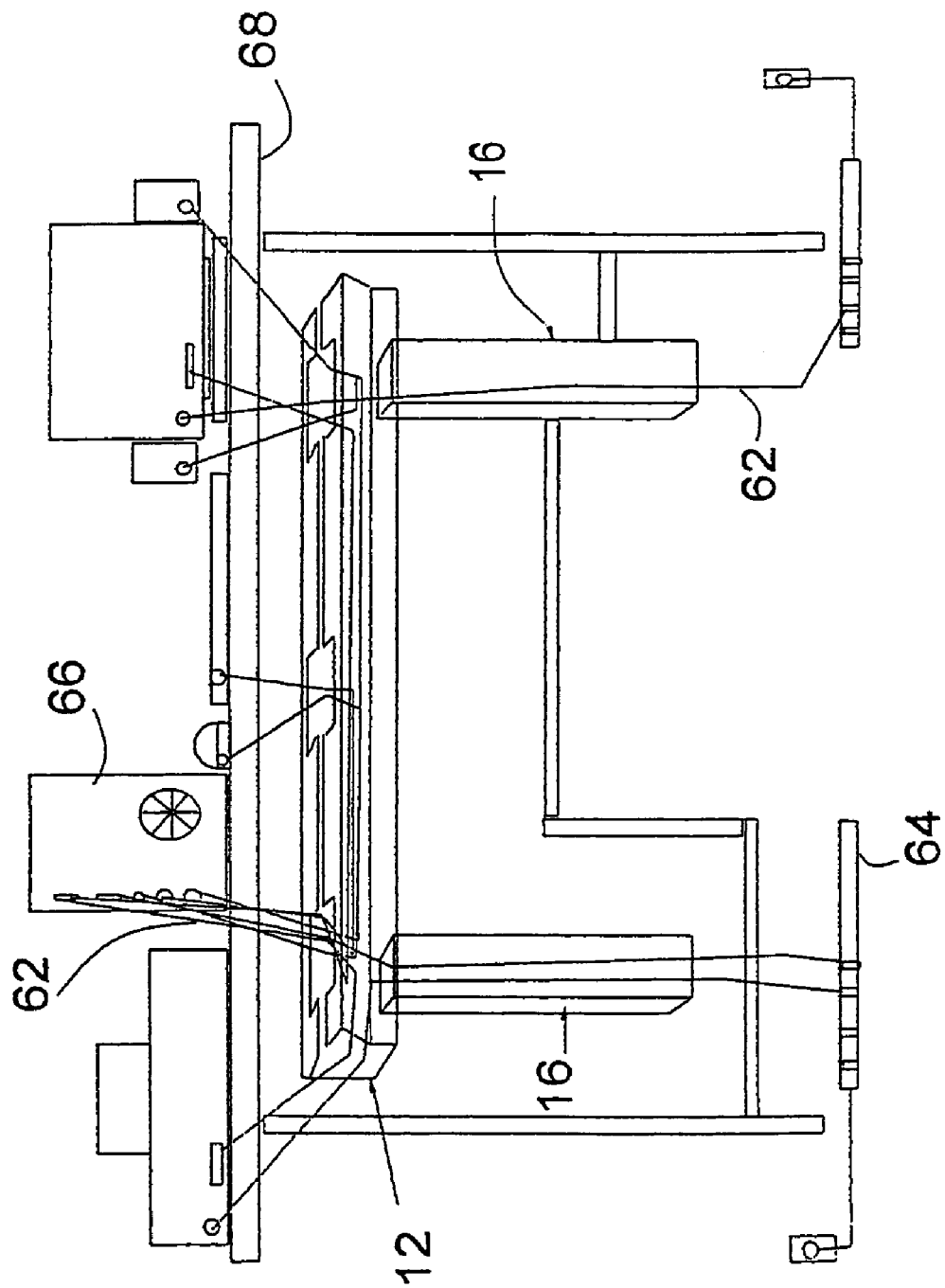

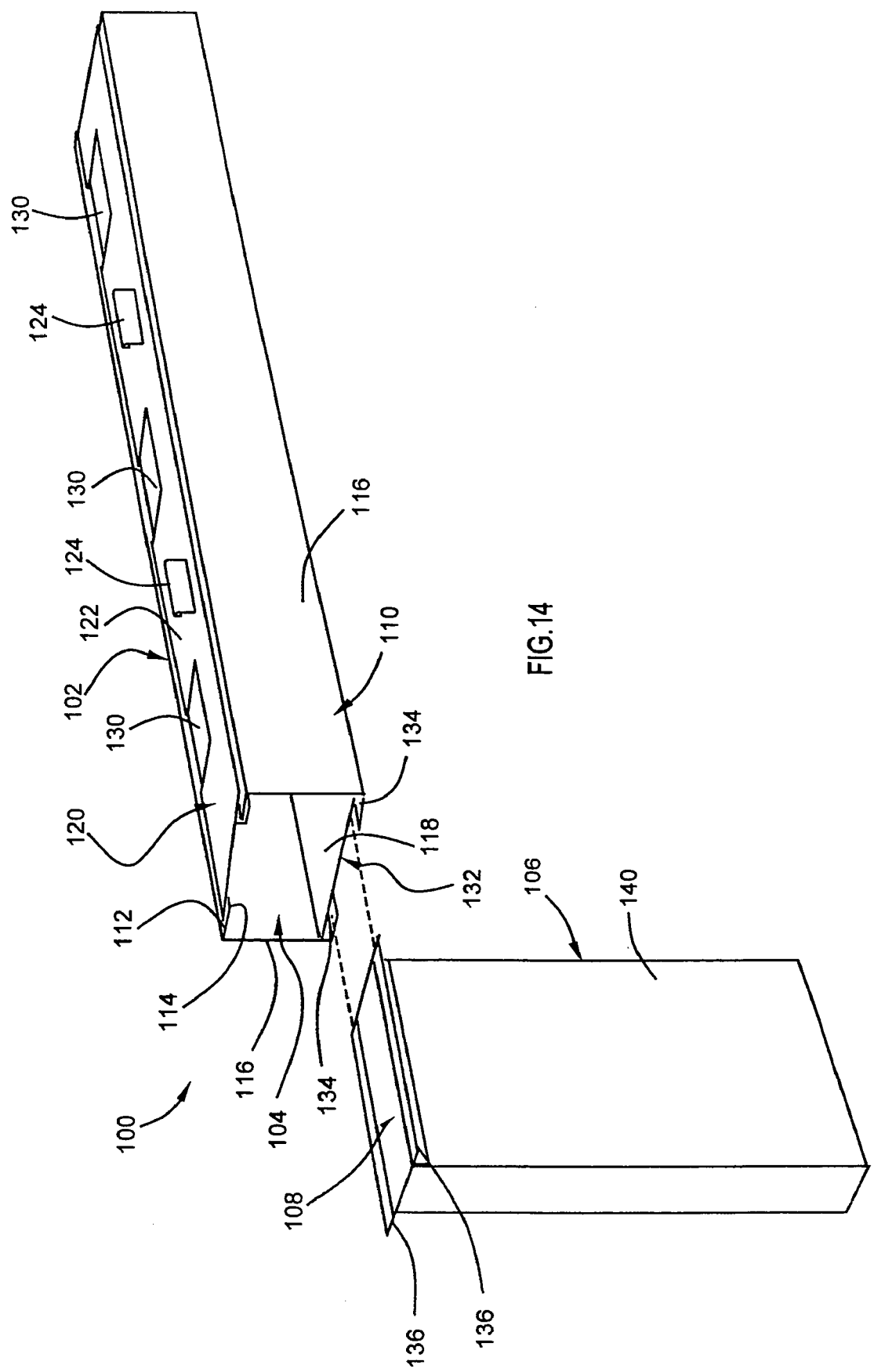

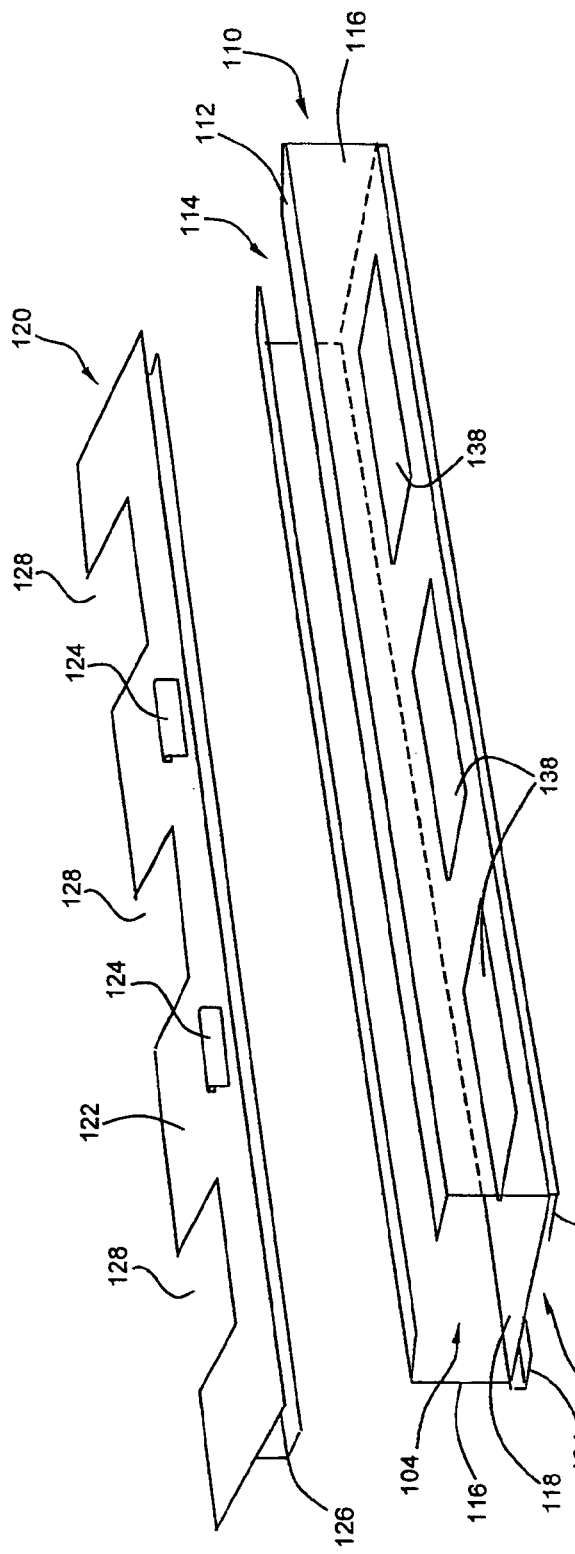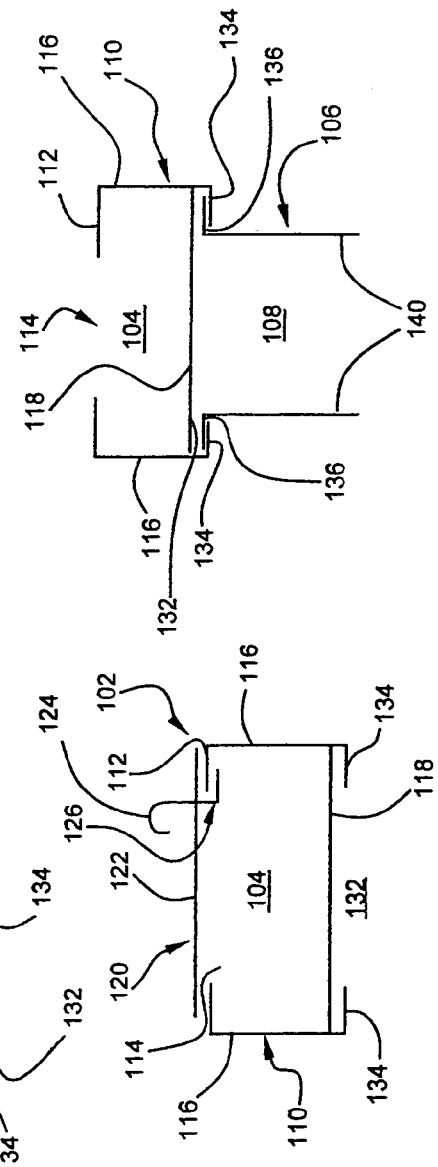

COMPUTER CABLE ORGANIZER

CROSS REFERENCE TO RELATED APPLICATION

This application is a continuation-in-part of U.S. patent application Ser. No. 10/872,977 filed Jun. 21, 2004, now U.S. Pat. No. 6,903,266, the specification of which is incorporated by reference herein.

FIELD OF THE INVENTION

The present invention relates generally to a cable guiding or raceway structure and more specifically to a structure for guiding cables or wires connected to computers in an organized fashion. The cable organizer is particularly useful for organizing power and communication cables of a personal computer and its peripherals and accessories, such as a monitor, printer, keyboard, scanner, speaker, mouse and external memory devices.

BACKGROUND OF THE INVENTION

Personal desktop computers typically include a main processor housing, a monitor and speakers separate from the housing and input devices such as a keyboard and mouse which are also separate from the housing. Cables are used to connect the monitor, printer, speakers and input devices to the processor housing. Power cables are also required to connect the processor housing, and usually the monitor, to a power source. Often, a printer, scanner and possibly other peripherals such as an external memory device are also connected to the processor housing and require dedicated power cables. It is thus a recognized fact that there are a relatively large number of cables required to enable use of a desktop personal computer system.

Since the components of the personal computer system are typically spread out over a desktop surface, the communication cables leading from each component to the processor housing are invariably placed in an unorganized manner and the power cables from each powered component to the external power supply are similarly placed in an unorganized manner.

Various devices have been developed which create passages for or enclose multiple cables associated with a desktop personal computer system in order to organize the cables and reduce the unsightly appearance of cables of a personal computer system. For example, U.S. Pat. No. 5,600,098 (Kazaks) describes an electronic cable organizer made of a single piece of material with longitudinally extending side edges which are releasably connected together. In use, the piece of material is opened at the side edges and cables are placed in the material so that when the side edges are subsequently connected together, the cables are enclosed by the material. Each end of the body includes reinforced portions through which cables can pass. The body also includes ingress/egress apertures between the ends through which the cables can be passed into the body or out of the body, e.g., to connect to a peripheral or to lead into an end of another body (see FIG. 18).

Other prior art which describes cable or wire organizers includes U.S. Pat. No. 4,255,610 (Textoris), U.S. Pat. No. 5,144,896 (Fortsch), U.S. Pat. No. 5,231,562 (Pierce et al.), U.S. Pat. No. 5,235,136 (Santucci et al.), U.S. Pat. No. 5,640,912 (Diffrient), U.S. Pat. No. 5,934,201 (Diffrient), U.S. Pat. No. 5,934,203 (Glass), U.S. Pat. No. 5,971,508 (Deimen et al.), U.S. Pat. No. 6,037,538 (Brooks) and Des. 251,779 (Wolff et al.)

OBJECTS AND SUMMARY OF THE INVENTION

It is an object of the present invention to provide a new and improved cable guiding structure which hides cables from view.

It is another object of the present invention to provide a new and improved structure for guiding cables or wires connected to computers in an organized fashion, and in particular for organizing power and communication cables of a desktop personal computer and its peripherals and accessories, such as a monitor, printer, keyboard, scanner, speaker, mouse and external memory devices.

In order to achieve these objects and others, an organizer for cables in accordance with the invention includes a first member defining an elongate channel receivable of cables and including a plurality of apertures through which the cables can be passed into or out of the channel, at least one of which is formed on a lower side of the first member, and a second member defining an elongate channel and slidably connected to the first member. The second member is alternatively alignable with each of the apertures in the lower side of the first member by sliding the second member along the lower side of the first member, e.g., in a channel formed in connection therewith for this purpose, such that the cables can be guided from the channel in the first member to the channel in the second member.

In use, the first member is arranged in a substantially horizontal orientation on the back of a desk or wall behind a desk on which the desktop computer is situated and the second member is arranged in a substantially vertical orientation on the back of the desk or wall and below the first, horizontal member. In this manner, the cables from the peripherals and accessories are guided directly into the horizontal member at the horizontal location where they are situated, through an aperture in the upper side of the horizontal member or through the ends of the horizontal member, with a minimum of cable being exposed. The cables are then guided through the channels in the first and second members to the connection port at the processor housing or an electrical receptacle. The vertical member is arranged proximate the processor housing to provide a minimum of exposed cable length, i.e., distance, between the opening of the second member and the rear of the processor housing.

Once the cable organizer in accordance with the invention is installed, the cables are substantially concealed with only a minimum length of the cables being exposed. Moreover, the cables are organized together in the cable organizer.

In one embodiment, the first and second members are provided with substantially polygonal cross-sections, e.g., rectangular, and both the upper and lower sides of the first member include apertures. Cables associated with the peripherals and accessories are passed from the channel in the first member through an aperture in the upper side thereof to the peripherals and accessories, i.e., preferably the aperture closest to the horizontal position of the peripheral or accessory on the desk. The lower side of the first member includes one or more apertures so that the second member is slidable along the lower side of the first member to align with one of these apertures, depending for example on which aperture will result in the second member being closest to the processor housing.

The channel of the first, horizontal member in which the second member slides preferably opens at one or both ends to enable the second member to be slid into this channel and removed therefrom. As such, it is possible to package the first and second members apart from one another, e.g., alongside one another, and then have the purchaser easily assembly the cable organizer.

To facilitate the placement of the cables into the first, horizontal member, the first member may be provided with a longitudinal slit which is openable to expose the channel therein. Specifically, the first member includes a base defining the lower side of the first member and having a slit on an upper side and a cover engaging with the base to substantially cover the slit, except for apertures which remain open to allow cables to pass therethrough. The apertures in the upper side of the first member are therefore formed by the cover and the base, and specifically by the overlap of the slit on the base and one or more notches formed on the cover. Preferably, the cover removably engages with the upper side of the base and includes at least one handle for enabling removal of the cover from engagement with the base. The cover also includes a locking flange formed on a lower surface and arranged to engage with an edge of the upper wall of the base defining the slit to thereby secure the cover to the base.

The first member may include an attachment mechanism to enable attachment thereof to a vertical surface such as the back of the desk or a wall behind the desk.

BRIEF DESCRIPTION OF THE DRAWINGS

The following drawings are illustrative of embodiments of the invention and are not meant to limit the scope of the invention as encompassed by the claims.

FIG. 1 is an exploded perspective view of a cable organizer in accordance with the invention.

FIG. 2 is a side view of one embodiment of a cable organizer in accordance with the invention.

FIG. 3 is a perspective view of the cable organizer in accordance with the invention shown with the channel access flap open.

FIG. 4 is a perspective view of the cable organizer in accordance with the invention shown with the channel access flap open and the alternative positions of the vertical member.

FIG. 5 is a perspective view of the vertical member of the cable organizer in accordance with the invention.

FIG. 6 is a perspective view of the horizontal member of the cable organizer in accordance with the invention.

FIG. 7 is a rear view of the horizontal member of the cable organizer in accordance with the invention.

FIG. 8 is a bottom view of the horizontal member of the cable organizer in accordance with the invention.

FIG. 9 is a perspective view of the cable organizer in accordance with the invention shown with cables and the end caps removed.

FIG. 10 is a perspective view of the cable organizer in accordance with the invention shown with cables and the end caps in place.

FIG. 13 is a rear view of a desktop personal computer system with the cable organizer in accordance with the invention.

FIG. 14 is a perspective view of another embodiment of a cable organizer in accordance with the invention.

FIG. 15 is an exploded view of the horizontal member of the cable organizer shown in FIG. 14.

FIG. 16 is a side view of the horizontal member shown in FIG. 15.

FIG. 17 is a side view of the cable organizer shown in FIG. 14 without a top piece.

DETAILED DESCRIPTION OF THE INVENTION

Figure 11:
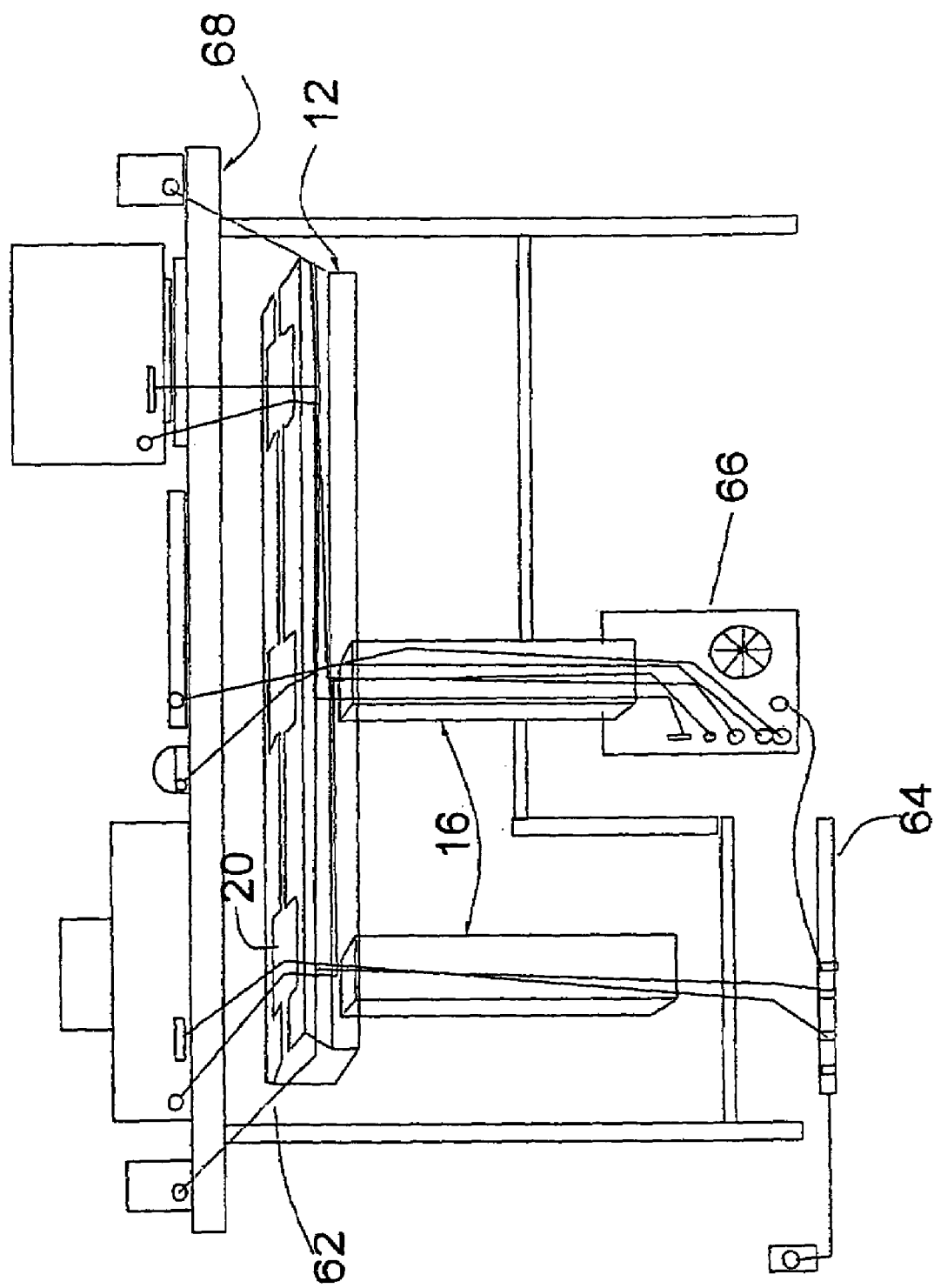
FIG. 11 is a rear view of a desktop personal computer system with the cable organizer in accordance with the invention.

Referring to the accompanying drawings wherein like reference numerals refer to the same or similar elements, FIG. 1 shows an organizer for cables in accordance with the invention which is designated generally as 10. The organizer 10 includes a first raceway member 12 defining an elongate channel 14 receivable of cables and a second raceway member 16 defining an elongate channel 18 receivable of cables and which is placed at an angle to the first member 12, preferably perpendicular thereto. As discussed in more detail below, the second member 16 is slidable relative to the first member 12 and therefore positionable at different positions along the length of the first member 12.

To enable cables from the computer and its peripherals and accessories to pass into and out of the channel 14 in the first member 12, apertures 20 are formed in an upper face 22 of the first member 12. Apertures 20 should be of sufficient size to enable standard cables used for personal computers and their peripherals and accessories to pass therethrough. The number of apertures 20 can vary depending, for example, on the length of the first member 12. Thus, one aperture 20 could be provided for every foot of length of the first member 12 so that a first member 12 having a three foot length would include three apertures 20 spaced evenly along the length of the first member 12.

The first member 12 also includes a sliding channel 24 formed along or below a lower face 26 and in which the second member 16 slides. Channel 24 is defined by a pair of opposed L-shaped lips 28 extending downward from longitudinally extending corners 30 of the first member 12. Lips 28 provide a support surface 32 on which flanges 34 formed at the upper end of the second member 16 rest and slide. Lips 28 may be formed integral with the remaining portion of the first member 12 or separate therefrom and attached thereto during fabrication of the organizer 10. In alternative embodiments, the lips 28 can be attached to front and rear faces 40, 42 of the first member 12 or to flanges projecting outward from the bottom of the front and rear faces 40, 42 (as shown in FIG. 2).

One or both ends of the channel 24 are open in order to enable the second member 16 to be inserted into and removed from the channel 24. This is advantageous since the organizer 10 might be packaged and sold with the first and second members 12, 16 side by side and assembly of the organizer 10 would be required. This assembly would entail simply sliding the second member 16 into the channel 24 through an open end thereof. An appropriate mechanism for retaining the second member 16 in the channel 24 in order to prevent unintentional or inadvertent removal of the second member 16 from the channel 24 could also be provided. For example, a removable clip, clasp or lock could be placed in engagement with the ends of the channel 24.

The lower face 26 of the front member 12 also includes one or more apertures 38 opening into the channel 24 and providing access between the cable-receiving channel 14 and the member-receiving channel 24. Apertures 38 enable cables from the channel 14 in the first member 12 to pass into the channel 18 in the second member 16 when the second member 16 is present in the channel 24 in a position in which its open upper end aligns with a respective one of the apertures 38. More particularly, the second member 16 is moved along the channel 24 until its open upper end aligns with one of the apertures 38 at which point, channel 18 is in communication with channel 14 and cables can pass between the channels 14, 18 in the first and second members 12, 16, respectively. FIG. 4 shows the various possible, operative positions of the second member 16 relative to the first member 12, and specifically, the second member 16 in alignment with each of the apertures 38 in the first member 12.

As with the apertures 20 in the upper face 22 of the first member 12, the number of apertures 38 can vary depending, for example, on the length of the first member 12 and when the first member 12 is particularly short, there may even be a single aperture 38. Apertures 38 in the lower face 26 of the first member 12 do not have to align with apertures 20 in the upper face 22. Indeed, each aperture 38 can be offset from the apertures 20. Moreover, there may be a different number of apertures 20 in the upper face 22 than apertures 38 in the lower face 26. At a minimum, there may be two apertures 38 in the lower face 26 and one aperture 20 in the upper face 22 since cables can also be passed into the channel 14 from the peripherals and accessories through the ends thereof.

Apertures 38 should be of sufficient size to enable a plurality of standard cables used for personal computers and their peripherals and accessories to pass therethrough. The size of apertures 38 might also be the same as the size of the open ends of the second member 16 to enable easy passage of cables from the channel 14 in the first member 12 through an aperture 38 and into the channel 18 in the second member 16.

Although cables can be placed into the channel 14 in the first member 12 through the apertures 20, it would be difficult to then guide these cables through the channel 14 and then through an aperture 38 leading into the channel 18 in the second member 16. Therefore, to facilitate the placement of cables into the channel 14 in the first member 12, preferably the first member 12 is designed to open to provide access to the channel 14. For example, in the illustrated embodiment, the first member 12 is formed with a longitudinal slit 46 on the upper face 22 and a hinge 48 on the front face 40 so that an access flap 50 is formed comprising a part of the front face 40 above the hinge 48 and a forward part of the upper face 22 in front of the slit 46. Flap 50 is pivotable about the hinge 48 to expose the channel 14.

A locking mechanism is provided to secure the flap 50 to the remaining portion of the first member 12, which is referred to as a mounting portion as it will be that portion which is mounted to a vertical surface such as the rear surface of a desk. The locking mechanism may comprise one or more flexible tabs 52 formed on the flap 50 and a corresponding cut-out 54 formed on the upper face 26 of the mounting portion of the first member 12. To open the flap 50 and expose the channel 14, each tab 52 is flexed upward out of engagement with the corresponding cut-out 54 and the flap 50 is then urged rearward to pivot about the hinge 48. To close the channel 14 once the cables have been threaded through the first and second members 12, 16, the flap 50 is pivoted forward until each tab 52 is present in the corresponding cut-out 54.

The slit 46 can be formed to traverse the apertures 20. In this case, when the flap 50 is in an open position, cables from the computer and its peripherals and accessories can be guided both through the apertures 20 into the channel 14 and through the channel 14 to and through one of the apertures 38 aligning with the open upper end of the second member 16 and into the channel 18 therein.

The mounting portion of the first member 12 includes a mechanism for enabling its attachment to a vertical surface such as the rear surface of a desk. This attachment mechanism may be arranged on or in connection with the rear face 42 of the first member 12 and may be any known type of attachment mechanism. For example, if hook and loop fasteners (e.g., VELCRO™, are used, one set of fasteners is adhered to the rear face 42 while another set is adhered to the vertical surface so that engagement of the sets of fasteners together results in attachment of the first member 12 to the vertical surface. Alternatively, double-sided adhesive could be used in a continuous strip along the rear face 42 or in segments 36 at different positions along the rear face 42 (see FIG. 7). A removable protective strip 44 is used to cover the adhesive strip segments 36 until the user is ready to attach the first member 12 to the vertical surface.

The first and second members 12, 16 may be made of a rigid plastic material and with a substantially rectangular cross-section, or with another polygonal configuration. The first member 12 would be formed with several longitudinally extending walls, i.e., a front wall defining the front face 40 and on which the hinge 48 may be formed, an upper wall defining the upper face 22 and on which the apertures 20 are formed, a rear wall defining the rear face 42 and on which the attachment mechanism is arranged, a lower wall defining the lower face 26 and in which the apertures 38 are arranged and which is formed above the lower edges of the front and rear walls (with the channel 14 being defined by these walls), and support flanges extending inward from the lower edges of the front and rear walls and a distance from the lower wall to thereby define the member-receiving channel 24 between the support flanges and the lower wall. A lower portion of the front and rear walls below the lower wall and the support flanges thereby define the L-shaped lips 28. End walls 56 may also be formed for the first member 12 to close the longitudinal ends of the channel 14. End walls 56 may be designed to be separable from the first member 12 for use in those situations where cables are to be passed into the channel 14 through one or both of its ends. For example, the end walls 56 could be formed to be able to be easily punched out from the first member 12, e.g., by forming perforations around the end walls 56.

In one embodiment, the upper and lower walls of the first member 12 may be formed with panels 58 covering the apertures 20, 38 and with means for enabling the panels 58 to be removed. FIG. 8 shows panels 58 covering the apertures 38. For example, the panels 58 could be attached to a remaining portion of the first member 12 by small strips of material so that open sections are provided between the strips of material which resemble perforations in the first member 12. The user would then break the strips of material holding the panel 58 in the aperture 20, 38 in order to ready the desired aperture(s) 20, 38 for use.

As shown in FIG. 5, the second member 16 may be formed with solid longitudinally extending walls and open longitudinal ends. Flanges 34 project outward from the upper edge of a pair of opposed walls. The upper width of the second member 16, i.e., from the outer edge of one flange 34 to the outer edge of the other flange 34 is less than the width of the channel 24 to enable the second member 16 to slide in the channel 24. Also, the width of the second member 16 is less than the space between the inner edges of the lips 28 to enable the second member 16 to fit between the lips 28.

It is envisioned that the organizer 10 would be packaged and sold as a kit with the first and second members 12, 16 placed side by side and enclosed in a common enclosure or bound together. It would also be preferable to sell a kit with only a single size of the first member 12 and a single size of the second member 16. Since different users may need a different length of the first and/or second members 12, 16, various kits might be needed and could be produced if so desired. However, to avoid this situation, the first and second members 12, 16 may be formed with peripherally weakened sections 60. Each peripherally weakened section 60, which may comprise score lines or perforations extending through the walls of the first and second members 12, 16, enables the first and second members 12, 16 to be shortened to the desired length by cutting or breaking the first and second members 12, 16 along one of the weakened sections 60. In this manner, the organizer 10 can be packaged and sold with a standard length of the first and second member 12, 16 while providing the user with the ability to reduce the length of the first member 12 and/or the height of the second member 16 to a desired dimension.

To use the organizer 10, the user would mount the first member 12 to the rear surface of a desk. Prior to or after such mounting, the user would slide the second member 16 into the member-receiving channel 24 in the first member 12 through an open end thereof. The end of the channel 24 through which the second member 16 is slid would preferably be the one closest to the aperture 38 in the first member 12 to be aligned with the channel 18 in the second member 16. The apertures 20, 38 to be used in the set-up would be identified and if present, panels 58 would be removed from the identified apertures 20, 38. The flap 50 is then pivoted outward to expose the channel 14 in the first member 12. Each cable from the computer and its peripherals and accessories is then inserted through a respective aperture 20 closest to the component, through the channel 14, through an aperture 38 in alignment with the channel 18 in the second member 16 and then into and through the channel 18. Once all of the cables have been passed into and through the organizer 10, the flap 50 is closed and each tab 52 is pressed into a corresponding cut-out 54.

Using the organizer 10, the various power and communication cables associated with a computer and its peripherals and accessories are effectively concealed and guided together in an aesthetically pleasing manner such as shown in FIGS. 9–13. The cables are represented by lines 62. As shown in FIG. 9, since the end walls 56 are removed, cables 62 can also be passed into the channel 14 in the first member 12 via the open ends thereof.

As shown in FIG. 11, it is also possible to use two vertically oriented second members 16, each in alignment with a respective aperture 38 and both being slidable in the channel 24. In this manner, one vertically oriented second member 16 could be positioned in alignment with the processor housing 66 which is placed below the desk 68 while the other could be positioned to lead to a power strip 64. The power cables would thus be directed through the second member 16 to the power strip 64.

Figure 12:
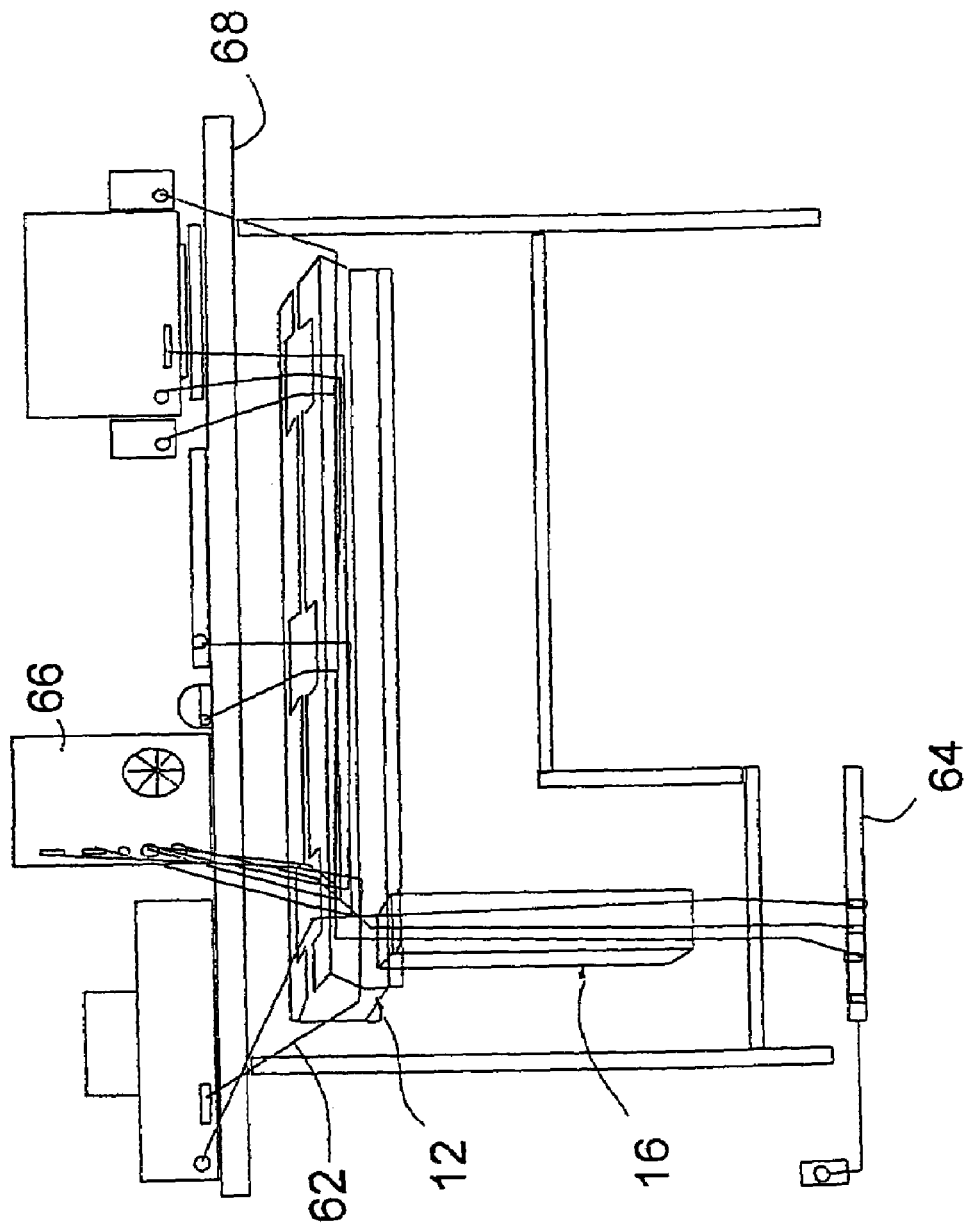
FIG. 12 is a rear view of a desktop personal computer system with the cable organizer in accordance with the invention.

As shown in FIG. 12, if the processor housing 66 is arranged on the desk 68, then only a single second member 16 is provided to guide the power cables to the power strip 64.

As shown in FIG. 13, two vertically oriented second members 16 are provided, each leading to a respective power strip 64.

From FIGS. 11–13, it can thus be seen that multiple vertically oriented second members 16 can be provided depending on the configuration of the personal computer system. The invention is not limited to anyone configuration and the first and second members 12, 16 can be used in a variety of different ways to achieve the objects of the invention.

Referring now to FIGS. 14–19, another embodiment of a cable organizer in accordance with the invention is generally designated as 100 and includes a first raceway member 102 defining an elongate channel 104 receivable of cables and a second raceway member 106 defining an elongate channel 108 receivable of cables and which is placed at an angle to the first member 102, preferably perpendicular thereto. The second member 106 is slidable relative to the first member 102 and therefore positionable at different positions along the length of the first member 102.

The first member 102 includes a base 110 having an upper wall 112 with a longitudinally extending slit 114, opposed front and rear walls 116 and a lower wall 118. Cables from the computer and its peripherals and accessories can pass into and out of the channel 104 in the first member 102 through the slit 114.

Figure 19:
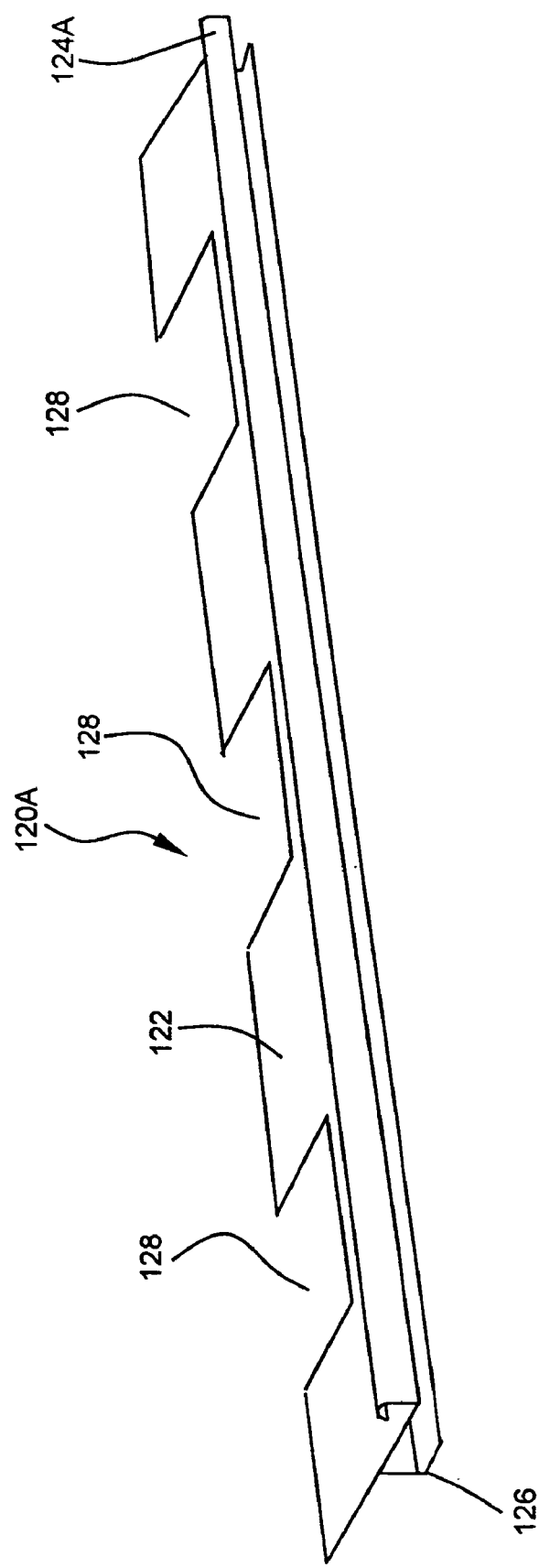
FIG. 19 is a perspective view of another embodiment of a cover for the cable organizer shown in FIG. 14.

The first member 102 also includes a cover 120 which operatively covers the slit 114 (see FIGS. 14 and 16). Cover 120 includes a substantially planar portion 122, at least one handle 124 and a substantially L-shaped locking flange 126 formed on a lower surface and adapted to engage with one edge of upper wall 112 defining the slit 114 to thereby secure the cover 120 to the base 110. In the illustrated embodiment, there are two handles 124, each having an upside down J-shape to facilitate pulling of the cover 120 up from engagement with the base 110 (see FIG. 16). Alternatively, one handle or possibly three or more handles can be provided. For example, FIG. 19 shows a cover 120A having a single handle 124A which extends across the substantially entire length thereof. Handle(s) 124, 124A present on the cover 120, 120A can have various different shapes and sizes and when multiple handles a provided, the shapes and sizes of the handles may be different.

Locking flange 126 can be designed to provide a reasonably tight engagement with the edge of the upper wall 112 to maintain the cover 120 in engagement with the base 110 in the absence of application of a separating force applied to the handle(s) 124 Planar portion 122 includes notches 128 which, when the cover 120 is engaged with the base 110, lead into the channel 104. As such, in use, cables from a computer and accessories can pass into the channel 104 through the notches 128. When the cover 120 is engaged with the base 110, the notches 128 partially overlap with the slit 114 thereby forming apertures 130 between the base 110 and cover 120.

The base 110 also includes a sliding channel 132 formed below the lower wall 118 and in which the second member 106 slides. Channel 132 is defined on its longitudinal sides by a pair of opposed L-shaped lips 134 extending downward from longitudinally extending corners of the base 110. Lips 134 provide a support surface on which flanges 136 of the second member 106 rest and slide. Lips 134 are may be formed integral with the base 110 or separate therefrom and attached thereto during fabrication of the organizer 100. In alternative embodiments, the lips 134 can be attached to front and rear faces or walls of the base 110 or to flanges projecting outward from the bottom of the front and rear faces or walls.

One or both ends of the channel 132 are open in order to enable the second member 106 to be inserted into and removed therefrom. This is advantageous since the organizer 100 might be packaged and sold with the first and second members 102, 106 side by side and assembly of the organizer 100 would be required. This assembly would entail simply sliding the second member 106 into the channel 132 through an open end thereof. An appropriate mechanism for retaining the second member 106 in the channel 132 in order to prevent unintentional or inadvertent removal of the second member 106 from the channel 132 could also be provided. For example, a removable clip, clasp or lock could be placed in engagement with the ends of the channel 132.

The lower wall 118 of the base 110 includes one or more apertures 138 providing access between the cable-receiving channel 104 and the member-receiving channel 132. Apertures 138 enable cables from the channel 104 to pass into the channel 108 in the second member 106 when the upper portion of the second member 106 is present in the channel 132 in a position in which its open upper end is in communication with a respective one of the apertures 138. More particularly, the second member 106 is moved along the channel 132 until its open upper end is in communication with one of the apertures 138 at which point, channel 108 is in communication with channel 104 and cables can pass between the channels 104, 108 in the first and second members 102, 106, respectively.

The number of apertures 138 can vary depending, for example, on the length of the base 110 and when the base 110 is particularly short, there may even be a single aperture 138. Aperture(s) 138 should be of sufficient size to enable a plurality of standard cables used for personal computers and their peripherals and accessories to pass therethrough. The size of aperture(s) 138 might also be the same as the size of the open ends of the second member 106 to enable easy passage of cables from the channel 104 in the first member 102 through an aperture 138 and into the channel 108 in the second member 106. Placement of cables into the channel 104 in the first member 102 is facilitated by separating the cover 120 from the base 110 to expose the slit 114 so that when the cover 120 is removed, cables from the computer and its peripherals and accessories can be guided through the slit 114 into the channel 104 and through the channel 104 to and through one of the apertures 138 in communication with the open upper end of the second member 106 and into the channel 108 therein.

The mounting portion of the first member 102 may be the same as that of the mounting portion of the first member 12 described above. The first and second members 102, 106 may be made of a rigid plastic material and with a substantially rectangular cross-section, or with another polygonal configuration. The first member 102 could be formed with several longitudinally extending walls, i.e., an upper wall 112 defining the slit 114, front and rear walls 116, a lower wall 118 defining the aperture(s) 138 and which is formed above the lower edges of the front and rear walls 116 (with the channel 104 being defined by these walls), and support flanges extending inward from the lower edges of the front and rear walls 116 and a distance from the lower wall 118 to thereby define the member-receiving channel 132 between the support flanges and the lower wall 118. A lower portion of the front and rear walls 116 below the lower wall 118 and the support flanges thereby define the L-shaped lips 122.

End walls (not shown) may also be formed for the first member 102 to close the longitudinal ends of the channel 104. End walls may be designed to be separable from the first member 102 for use in those situations where cables are to be passed into the channel 104 through one or both of its ends. For example, the end walls could be formed to be able to be easily punched out from the first member 102, e.g., by forming perforations around the end walls.

In one embodiment, the lower wall 118 of the base 110 and the cover 120 may be formed with panels covering the apertures 138 and notches 128, respectively, and with means for enabling the panels to be removed. For example, such panels could be attached to a remaining portion of the lower wall 118 or cover 120 by small strips of material so that open sections are provided between the strips of material which resemble perforations. The user would then break the strips of material holding the panel in connection with the remaining portion of the material in order to ready the desired aperture(s) 138 and notch(es) 128 for use.

Figure 18:
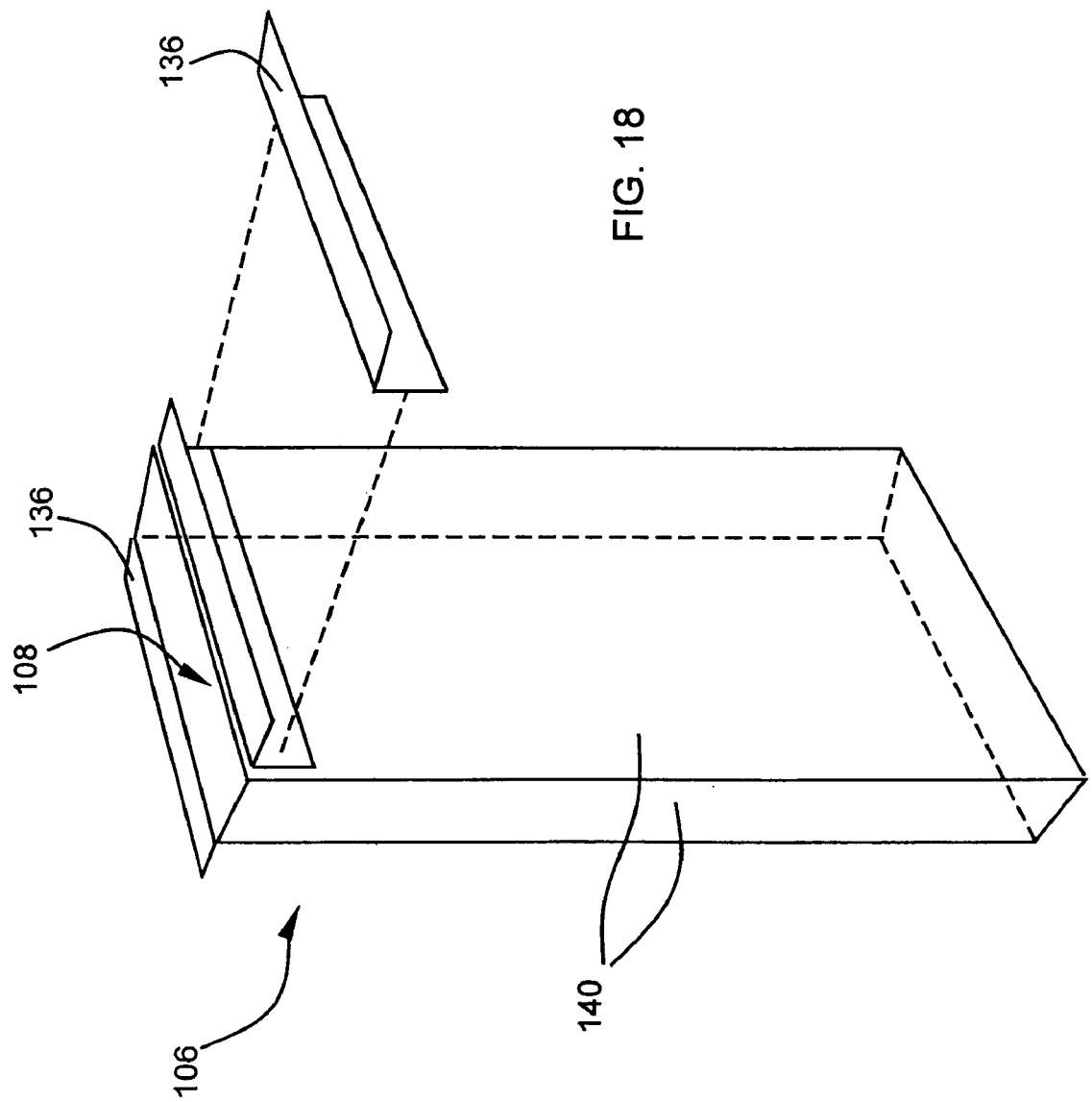
FIG. 18 is a partially exploded view of the vertical member of the cable organizer shown in FIG. 14.

As shown in FIG. 18, the second member 106 may be formed with solid longitudinally extending walls 140 and open longitudinal ends. Flanges 136 are attached to the upper edge of a pair of opposed walls 140 at one longitudinal end of the second member 106, e.g., using adhesive, to project outward therefrom. The upper width of the second member 106, i.e., from the outer edge of one flange 136 to the outer edge of the other flange 136 is less than the width of the channel 132 to enable the second member 106 to slide in the channel 132 (see FIG. 17). Also, the width of the second member 106 is less than the space between the inner edges of the lips 122 to enable the second member 106 to fit between the lips 122.

It is envisioned that the organizer 100 would be packaged and sold as a kit with the first and second members 102, 106 placed side by side and enclosed in a common enclosure or bound together. It would also be preferable to sell a kit with only a single size of the first member 102 and a single size of the second member 106. Since different users may need a different length of the first and/or second members 102, 106, various kits might be needed and could be produced if so desired. However, to avoid this situation, the first and second members 102, 106 may be formed with peripherally weakened sections, each of which may comprise score lines or perforations extending through the walls of the first and second members 102, 106, to enable the first and second members 102, 106 to be shortened to the desired length by cutting or breaking the first and second members 102, 106 along one of the weakened sections. In this manner, the organizer 10 can be packaged and sold with a standard length of the first and second member 102, 106 while providing the user with the ability to reduce the length of the first member 102 and/or the height of the second member 106 to a desired dimension.

To use the organizer 100, the user would mount the first member 102 to the rear surface of a desk (reducing the length of the first member 102 to the desired size if possible and desired). Prior to or after such mounting, the user would slide the second member 106 into the member-receiving channel 132 in the first member 102 through an open end thereof. The end of the channel 132 through which the second member 106 is slid would preferably be the one closest to the aperture 138 in the lower wall 118 of the base 110 of the first member 102 to be in communication with the channel 108 in the second member 106. The aperture 138 and notch(es) 128 to be used in the set-up would be identified and if present, panels would be removed to expose them. The cover 120 is separated from the base 110 to expose the slit 114 leading to the channel 104 in the first member 102. Each cable from the computer and its peripherals and accessories is then inserted through the slit 114 through the channel 104, through the identified aperture 138 in communication with the channel 108 in the second member 106 and then into and through the channel 108. Once all of the cables have been passed into and through the organizer 100, the cover 120 is engaged with the base 110 while positioning the cables into one or more of the notches 128. If necessary or desired, cables can also be passed into the channel 104 in the first member 102 via the open ends thereof.

Using the organizer 100, the various power and communication cables associated with a computer and its peripherals and accessories are effectively concealed and guided together in an aesthetically pleasing manner.

It is possible to use two vertically oriented second members 106, each in communication with a respective aperture 138 and both being slidable in the channel 132. In this manner, one vertically oriented second member 106 could be positioned in alignment with the processor housing which is placed below the desk while the other could be positioned to lead to a power strip. The power cables would thus be directed through the second member 106 to the power strip.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. For example, variations to the first and second members 12, 16 include the formation of the first and second members 12, 16 in any one of a variety of different colors and textures, such as black, putty, tan, gray, white and wood-grain. By providing a variety of colors, an organizer 10 can be purchased which matches the mounting location, i.e., matches the purchaser's desk.

I claim:

1. An organizer for cables, comprising:
   a first member defining an elongate channel receivable of cables, said first member including a plurality of apertures through which the cables are passable into or out of said channel, at least one of said apertures being on a lower side of said first member; and
   a second member defining an elongate channel and slidably connected to said first member, said channel in said second member being alternatively in communication with each of said at least one aperture on said lower side of said first member by sliding said second member along said lower side of said first member such that the cables are passable from said channel in said first member to said channel in said second member through one of said at least one aperture.

2. The organizer of claim 1, wherein said first member comprises a base defining said lower side of said first member and a cover engaging with said base, at least one of said apertures being formed on an upper side of said first member by said cover and said base.

3. The organizer of claim 2, wherein said cover removably engages with an upper side of said base.

4. The organizer of claim 2, wherein said cover includes at least one handle for removing said cover from engagement with said base.

5. The organizer of claim 4, wherein said at least one handle comprises a single handle extending across substantially the entire length of said cover.

6. The organizer of claim 4, wherein said at least one handle comprises a plurality of handles spaced apart from one another.

7. The organizer of claim 2, wherein said base includes an upper wall defining a longitudinally extending slit and said cover defines at least one notch whereby when said cover is engaged with said base, at least one aperture is formed by overlap of said at least one notch with said slit.

8. The organizer of claim 7, wherein said cover includes a substantially planar portion in which said at least one notch is formed, at least one handle and a substantially L-shaped locking flange formed on a lower surface and arranged to engage with an edge of said upper wall of said base defining said slit.

9. The organizer of claim 8, wherein said locking flange extends through said slit when said cover is engaged with said base.

10. The organizer of claim 2, further comprising locking means for removably locking said cover to said base.

11. The organizer of claim 10, wherein said locking means comprise an L-shaped flange formed on a lower face of said cover and arranged to engage an edge of an upper wall of said base defining said slit.

12. The organizer of claim 1, wherein said first member includes a second channel along said lower side which opens at one end of said first member to enable said second member to be slid into said second channel and removed from said second channel.

13. The organizer of claim 1, further comprising attachment means arranged in connection with said first member for attaching said first member to a vertical surface.

14. The organizer of claim 1, wherein said first and second members are rigid.

15. The organizer of claim 1, wherein said channel of said first member has open longitudinal ends.

16. An organizer for cables, comprising:
    a first member defining an elongate channel receivable of cables, said first member including a plurality of apertures through which the cables are passable into or out of said channel, said first member including a base defining a lower side of said first member and a cover engaging with an upper side of said base, at least one of said apertures being formed on a first, upper side of said first member by said cover and said base and at least one of said apertures being formed on a second side of said first member; and
    a second member defining an elongate channel and slidably connected to said first member, said channel in said second member being alternatively in communication with each of said at least one aperture on said second side of said first member by sliding said second member along said second side of said first member such that the cables are passable from said channel in said first member to said channel in said second member through one of said at least one aperture.

17. The organizer of claim 16, wherein said second side of said first member is a lower side of said first member opposite said upper side of said first member.

18. The organizer of claim 16, wherein said cover removably engages with said upper side of said base and includes at least one handle for removing said cover from engagement with said base.

19. The organizer of claim 16, wherein said base includes an upper wall defining said upper side and a longitudinally extending slit and said cover defines at least one notch whereby when said cover is engaged with said base, said at least one aperture on said upper side of said first member being formed by overlap of said at least one notch with said slit.

20. The organizer of claim 19, wherein said cover includes a substantially planar portion in which said at least one notch is formed, at least one handle and a substantially L-shaped locking flange formed on a lower surface and arranged to engage with an edge of said upper wall of said base defining said slit.

* * * * *